(12) United States Patent
Fischer et al.

(10) Patent No.: US 6,246,173 B1
(45) Date of Patent: Jun. 12, 2001

(54) FREE-RUNNING OSCILLATOR CIRCUIT WITH SIMPLE STARTING CIRCUIT

(75) Inventors: Klaus Fischer, Augsburg; Harald Schmitt, Munich, both of (DE)

(73) Assignee: Patent-Treuhand-Gesellschaft fuer elektrische Gluehlampen mbH, Munich (DE)

( * ) Notice: Subject to any disclaimer, the term of this patent is extended or adjusted under 35 U.S.C. 154(b) by 0 days.

(21) Appl. No.: 09/193,223

(22) Filed: Nov. 17, 1998

(30) Foreign Application Priority Data

Nov. 18, 1997 (DE) .............................. 197 51 063

(51) Int. Cl.$^7$ .................................................. H05B 37/02
(52) U.S. Cl. .............................. 315/DIG. 7; 315/DIG. 5; 315/219; 315/224
(58) Field of Search ................... 331/117 FE, 113 A; 315/DIG. 7, 209, 224, 223, 219, DIG. 5, 205; 363/18, 37, 124

(56) References Cited

U.S. PATENT DOCUMENTS

| 4,748,383 | 5/1988 | Houkes | 315/248 |
| 5,262,699 | * 11/1993 | Sun | 315/209 R |
| 5,349,270 | 9/1994 | Roll et al. | 315/209 R |
| 5,574,335 | * 11/1996 | Sun | 315/119 |
| 5,825,136 | * 10/1998 | Rudolph | 315/291 |

FOREIGN PATENT DOCUMENTS

| 195 48 506 A1 | * 6/1997 | (DE) . |
| WO97/38561 | 10/1997 | (WO) . |

* cited by examiner

Primary Examiner—Benny Lee
Assistant Examiner—Kimberly E Glenn
(74) Attorney, Agent, or Firm—Carlo S. Bessone

(57) ABSTRACT

A new starting circuit ALS for a free-running oscillator circuit, in particular for a field-effect transistor half-bridge in an electronic ballast for a low-pressure gas discharge lamp EL is described. By using a starting capacitor C5, it is possible to dispense with a diac.

4 Claims, 4 Drawing Sheets

FREE-RUNNING OSCILLATOR CIRCUIT WITH SIMPLE STARTING CIRCUIT

BACKGROUND OF THE INVENTION

This invention relates to an operating circuit for a load in which an oscillator circuit produces a high-frequency power to supply the load. For this purpose, the oscillator circuit itself is supplied with a supply power, for example a rectified mains power. Here, oscillator circuits with voltage-controlled switching elements, for example field-effect transistor half-bridges, are considered specifically. Such operating circuits are principally applied in electronic ballasts for low-pressure gas discharge lamps.

An aspect of such operating circuits which is important for this invention results from the need to initiate the free-running oscillation of the oscillator when operation is started. Frequently, in order to produce the free-running oscillation, coupled controlled transformers, for example, are used to drive the switching elements of the oscillator. However, the positive feedback effect is produced only in the actual oscillation mode and at the beginning has to be produced only, as it were, by an external impetus.

A known solution for a starting circuit which produces this impetus when the supply power is switched on can be found in the German Application DE 195 48 506 A1. Here, after the supply power is switched on, a capacitor is charged via a resistor until the breakdown voltage of a diac is reached. Its breakdown discharges a portion of the charge stored in the capacitor into a drive circuit of a field-effect transistor of a half-bridge oscillator. Further details can be found in the quoted document.

SUMMARY OF THE INVENTION

This invention is based on the technical problem of specifying an operating circuit of the type described at the beginning, with an improved starting circuit.

For this purpose, the invention provides an operating circuit for a load, in particular a low-pressure gas discharge lamp, with a free-running oscillator with voltage-controlled switching elements for producing a high-frequency output power for the load from a supply power which is characterized by a starting circuit for initiating the free-running oscillation with a starting capacitor connected between a drive circuit at a control terminal of a switching element and a reference potential of the switching element.

Firstly, the invention is based here on the recognition that the diac used in the prior art constitutes a significant disadvantage of the conventional solution. It has become apparent, namely, that diacs exhibit a failure rate which is above average in comparison with other components used in the operating circuits, and thus lead to unnecessarily high failure rates of the electronic ballasts or other operating circuits equipped with them.

For this reason, the solution according to the invention dispenses with the use of a diac. Instead, a capacitor is provided which is referred to here as a starting capacitor. The starting capacitor has the function, given increasing charging by its connection to a reference potential of a switching element, for example to a power supply branch, of enabling a drive circuit of the oscillator or one of its switching elements to bring about a first switching process of the respective switching element, after the power supply has been switched on. Here, it is necessary to consider the fact that in the case of voltage-controlled switching elements this does not require very high currents but rather merely a certain voltage. Voltage-controlled switching elements have basically one defined threshold voltage in terms of their switching-on or switching-off procedure. The breakdown procedure of the diac which the invention is, as explained, intended to avoid can therefore be replaced by approaching and exceeding the voltage threshold value of the switching element. This procedure is brought about directly or indirectly by the starting capacitor which charges up when the power supply is switched on.

This may take place, for example, by virtue of the fact that the potential of a relatively complex drive circuit, of which more details will be given below, is displaced in its entirety by the starting capacitor. However, it is not absolutely necessary to provide a relatively complex drive circuit, instead, in the simplest case, it is also possible here to provide just one connection point of a positive feedback device, of whatever kind, for the free-running oscillation (for example the secondary winding of a control transformer) as "drive circuit" in the minimal sense, with the result that the voltage applied to the starting capacitor acts virtually directly on the control terminal of the voltage-controlled switching element. These simple "minimum versions" of a drive circuit could be considered in the case of the control transformer when, for example, the primary winding already has applied to it the correct phase delay for driving the switching elements.

At any rate, in accordance with the invention, the use of a starting capacitor is proposed as a simple and cost-effective component, making the diac with the described disadvantages superfluous.

In preferred applications of the invention, the oscillator is a half-bridge circuit such as is known in electronic ballasts. Preferred examples of voltage-controlled switching elements are, in particular, field-effect transistors, especially MOSFETs or else IGBT ("Insulated Gate Bipolar Transistor").

Preferably, the starting capacitor is charged easily by means of a charging resistor which is connected between the starting capacitor and a potential which is suitable for charging, for example a power supply branch, and which should be dimensioned with relatively high impedance so that the starting circuit causes little disruption, that is, no asymmetry effects, during the oscillation mode.

In order to avoid a stable state of the entire operating circuit, otherwise possible under certain circumstances, after the power supply is switched on, it may, for example, be advantageous to select the connection point used for charging the starting capacitor such that a certain oscillation or fluctuation of the potential is present at it. For this purpose, it is possible, for example in the case of a mains connection of the operating circuit via a rectifier, to connect the charging resistor to an AC voltage terminal on the mains input side of the rectifier. However, it is also possible to find other solutions here which are appropriate particularly if there is no mains AC voltage at all, for example when the circuit is being operated from a battery supply. Then, the aforesaid fluctuation or oscillation can be produced specifically, for example by means of a bistable component such as a flip-flop. However, the electronic low-pressure gas-discharge-lamp ballasts which are particularly considered for application in the operating circuit according to the invention are, as a rule, configured for mains operation.

Furthermore, it may be advantageous also to provide, in addition to the charging resistor, a discharging resistor parallel to the starting capacitor. The discharging resistor supports its discharging, in particular given a standing oscillation of the oscillator. In order to increase the operational reliability, it is particularly appropriate if, in the case of mains operation, a rectifier and a large electrolytic capacitor which has been charged by the latter is used. This aspect relates to those operating phases in which the rectifier does not charge the electrolytic capacitor and there is thus no potential connection between the rectified side and the mains side. In this "floating" state of the rectified side, the influence of displacement capacitances in the rectifier may disrupt the potential conditions at a charging resistor connecting the mains side and the rectified side and thus disrupt its discharging function.

A further advantageous refinement of the invention consists in a discharging diode for cyclically discharging the starting capacitor in the oscillation mode. This discharging diode is connected in such a way that during the actual starting process it initially blocks and thus permits the starting capacitor to charge. Once the free-running oscillation of the operating circuit has been initiated, potential states which cyclically discharge the starting capacitor via the discharging diode occur on the other connection side of the discharging diode with the oscillation frequency. In other potential states, the discharging diode blocks. It is preferably connected between the drive circuit-side terminal of the starting capacitor and the terminal of the switching element which is remote from the supply branch, in a bridge circuit that is to say a centre tap of the bridge.

As already stated, various possibilities are conceivable for the concrete embodiment of the term "drive circuit" which is generally used here. Two preferred variants which have proven very suitable for reliable and low-loss operation, in particular of a half-bridge circuit, are the following. In the first case, a parallel circuit comprising a capacitor and a coil is connected in parallel in the drive circuit of a series circuit comprising a resistor and a secondary winding of a control transformer, the series circuit and the parallel circuit both being connected to the control terminal of the respective switching element. In this case, the parallel circuit of capacitor and coil forms an oscillatory circuit. In the second case, the coil which lies in parallel with the capacitor is omitted. The mode of operation, advantages and further variants of these two forms can be found in the following documents whose disclosures are, in this respect, included in this application: firstly DE 41 29 430 A1 and DE 195 48 506 A1, which has already been mentioned.

In order to specify the potential state of the operating circuit in a defined fashion before the switching-on procedure for initiating the starting procedure, it is possible to provide, for example, a resistor between a terminal of one of the switching elements which is remote from the supply branch and a supply branch. By means of such a resistor, which naturally has high impedance for fault-free normal operation, the potential of the respective terminal which is remote from the supply branch is in the idle state at the potential of the supply branch, i.e. during the starting procedure there is initially no voltage, or essentially the entire (rectified) supply voltage present at specific switching elements.

BRIEF DESCRIPTION OF THE DRAWINGS

Three concrete exemplary embodiments of the invention will be described below with reference to the figures, in which case the individual features which are disclosed here may also be essential to the invention in combinations other than those shown, or individually. In the figures.

BEST MODE FOR CARRYING OUT THE INVENTION

Figure 1:
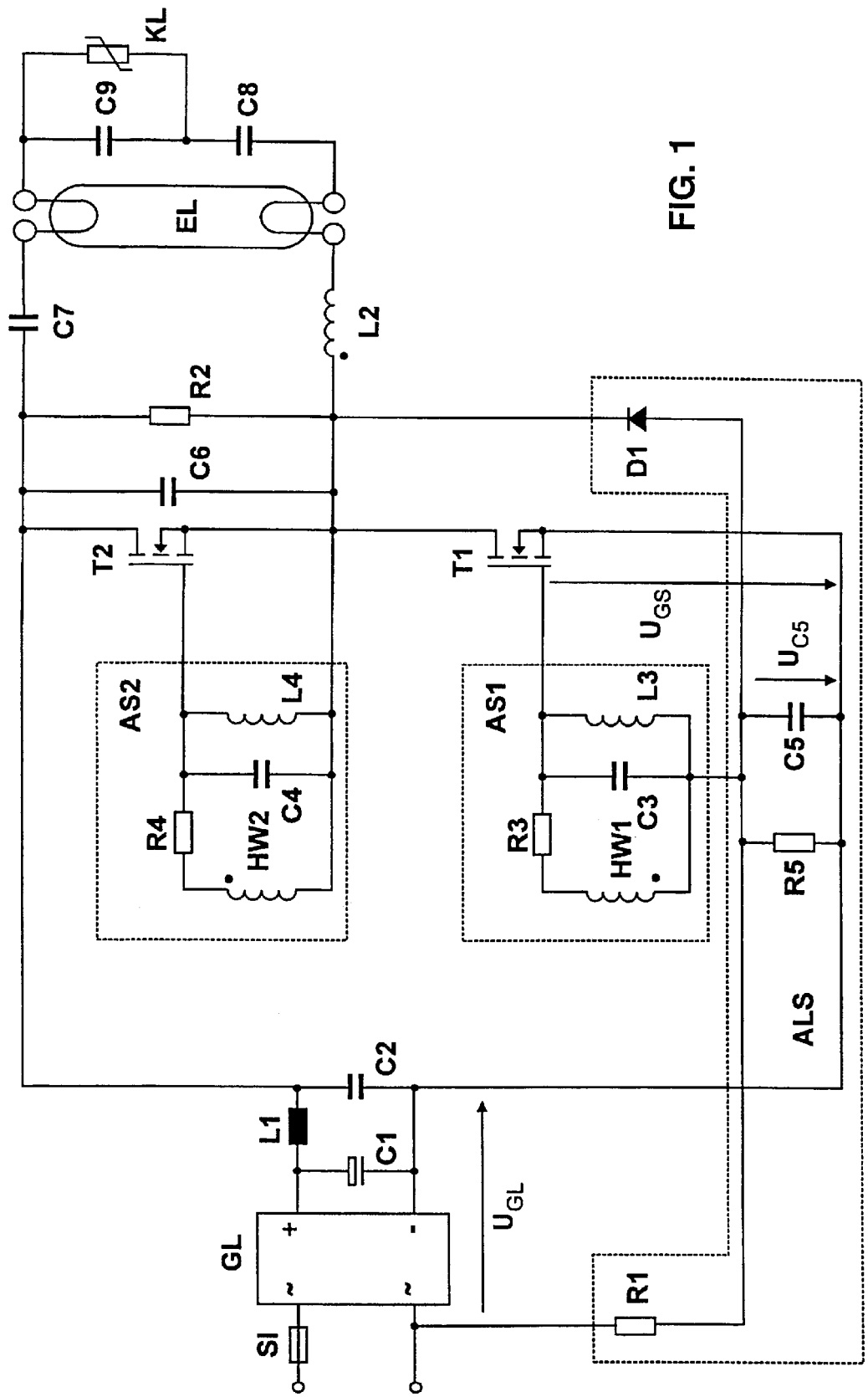
FIG. 1 shows a circuit diagram of an operating circuit according to the invention.

FIG. 1 shows an operating circuit in an electronic ballast for a low-pressure gas discharge lamp which is illustrated as load EL. Here, a rectifier GL is supplied with mains voltage via a fuse SI, said rectifier GL feeding an electrolytic capacitor C1, or maintaining its voltage. Two supply branches are tapped at the electrolytic capacitor C1 via a filter of a coil L1 in one of the branches and a capacitor C2 connecting the two branches.

The lower supply branch in the figure has negative potential and defines the reference potential on the rectified side of the operating voltage. The upper supply branch is positive with respect to it. Between the two supply branches there is a half-bridge made of two MOSFET transistors T1 and T2, N-type channel transistors each with a source terminal on the negative side being used. A load circuit composed of a load-serial lamp reactor L2, the low-pressure gas discharge lamp EL and the load-serial coupling capacitor C7 is located between a centre tap of the half-bridge and the positive supply branch. In addition, a load-parallel connection to two resonance capacitors C8 and C9 and to a PTC thermistor KL for firing the lamp is provided.

For switching relief of the MOSFET transistors T1 and T2, a capacitor C6 is connected in parallel with the upper half-bridge transistor T2.

Between the source terminal of the MOSFET transistors T1 and T2 as transistor-internal reference potential and the respective gate terminal there is in each case a drive circuit AS1 and/or AS2. However, in the case of the lower half-bridge transistor T1, the drive circuit AS1, is connected to the source terminal of the transistor T1 via the starting circuit ALS which is described in more detail below. The drive circuits AS1 and AS2 are of identical design and are composed of a parallel circuit comprising a coil L3 or L4, a capacitor C3 or C4 and a series circuit comprising a secondary winding HW1 or HW2 of a control transformer whose primary winding is the already mentioned lamp reactor L2, and a resistor R3 or R4. The secondary windings are, as indicated by the dots at HW1, HW2 and L2, wound in opposite directions.

The previously described circuit elements are known and can thus also be found in the already quoted document DE 195 48 506 A1. This application and the other relevant prior art should be referred to for further details.

In the lower region of FIG. 1, the starting circuit ALS is outlined with a dashed line, but a resistor R2 between the centre tap of the half-bridge and the positive supply branch actually belongs to it also. In the starting circuit there is initially a starting capacitor C5 between the drive circuit AS1 of the lower bridge transistor T1 and the negative supply branch. In parallel to this there is a discharging resistor R5. In series with the starting capacitor C5 there are, in a connection to the centre tap of the half-bridge, a discharging diode D1 with its anode on the starting capacitor C5 side, and a charging resistor R1 in a connection to an AC voltage terminal on the input side of the rectifier GL.

Directly after the operating circuit is switched on, that is to say after the mains voltage has been fed into the rectifier GL, the resistor R2 keeps the centre tap of the half-bridge at the potential of the positive supply branch. Thus, virtually the entire DC voltage of the electrolytic capacitor C1 is present at the lower bridge transistor T1. The essential feature is that, below, the voltage $U_{C5}$ at the starting capacitor C5, added to the voltage of the drive circuit 1, that is to say the voltage at the capacitor C3, is present between the source terminal and the gate terminal of the bridge transistor T1, as $U_{GS}$ in the figure.

Because there is no positive feedback by the control transformer L2-HW1/HW2 and no potential oscillation at the centre point of the half-bridge, the drive circuits AS1 and AS2 do not initially emit an output signal, with the result that the starting circuit ALS has to provide for a first switching procedure. In the present exemplary case, an initial switching on of the bridge transistor T1 takes place as a result of the starting capacitor C5 being charged via the charging resistor R1 by way of a mains feed line. If the voltage $U_{C5}$ at the starting capacitor C5 has reached the threshold voltage, necessary for initial switching on, between the gate terminal and the source terminal of the bridge transistor T1, the voltages $U_{C5}$ and $U_{GS}$ correspond to one another at the beginning because the drive circuit AS1 is not active, current begins to flow through the transistor T1 and the load circuit.

The current in the lamp reactor L2 then initiates the positive feedback mechanism by producing an induction current in the secondary windings HW1 and HW2 in accordance with the winding ratio on this lamp reactor L2. The transistor T1, which is now conductive, discharges, together with the discharging diode D1, the starting capacitor C5—and the potential at the bridge centre tap drops—but the induction current in the secondary winding HW1 charges the capacitor C3 via the resistor R3 and thus keeps the transistor T1 switched on. If, therefore, the first switching on of the bridge transistor T1 by the voltage $U_{C5}$ at the starting capacitor C5 has thus produced adequate conductivity in the transistor T1, the free-running oscillation is initiated via the positive feedback mechanism and reaches a steady state over a few periods.

In the "normal" free-running mode, the potential oscillation at the centre point of the bridge ensures, on a cyclical basis, that the starting capacitor C5 is discharged via the discharging diode D1 and thus keeps the voltage $U_{C5}$ negligibly small. In the exemplary embodiment shown in FIG. 1, the charging resistor R1 is connected to a mains feed line on the input side of the rectifier GL. This has the following background: the intention is to reliably avoid a steady state over several mains half waves, which can occur for example if the load current for reasons associated with the lamp EL breaks away at short notice, and the positive feedback is thus interrupted at a point in time at which the voltage $U_{C5}$ is equal to the switch-on threshold voltage of the bridge transistor T1, and the overall discharge current via the discharging diode D1 and the bridge transistor T1 compensates, after the steady state has been reached, the current which is charging the starting capacitor C5 and flowing via the charging resistor R1. In this stable state, the potential at the centre point of the bridge would have already been reduced to the potential of the negative supply branch by the low conductivity of the transistor T1, as a result of which the voltage at the electrolytic capacitor C1 would correspond essentially to the total voltage at the capacitors C7, C8 and C9 of the load circuit. The drain-source voltage at the transistor T1 would then be virtually identical to the gate-source voltage $U_{GS}$. In such a state, a renewed starting attempt would be necessary, which is ensured in the present case by virtue of the fact that the mains frequency oscillation of the charging current, flowing via the charging resistor R1, of the starting capacitor C5 discharges the capacitor C5 again via the charging resistor R1 if the voltage $U_{GS}$ shown in FIG. 1 becomes negative. As a result, a starting attempt may take place again.

For the reasons already outlined in the introduction to the description, there may be difficulties with the discharging of the starting capacitor C5 as a result of the charging capacitor R1 in the case of negative voltage $U_{GS}$, that is to say when the electrolytic capacitor C1 is not recharged. For this reason, the additional discharging resistor R5 is provided. Its function has already been described. The discharging of the starting capacitor C5 which is provided in any case safeguards the previously described mechanism of repeated starting attempts.

Figure 2:
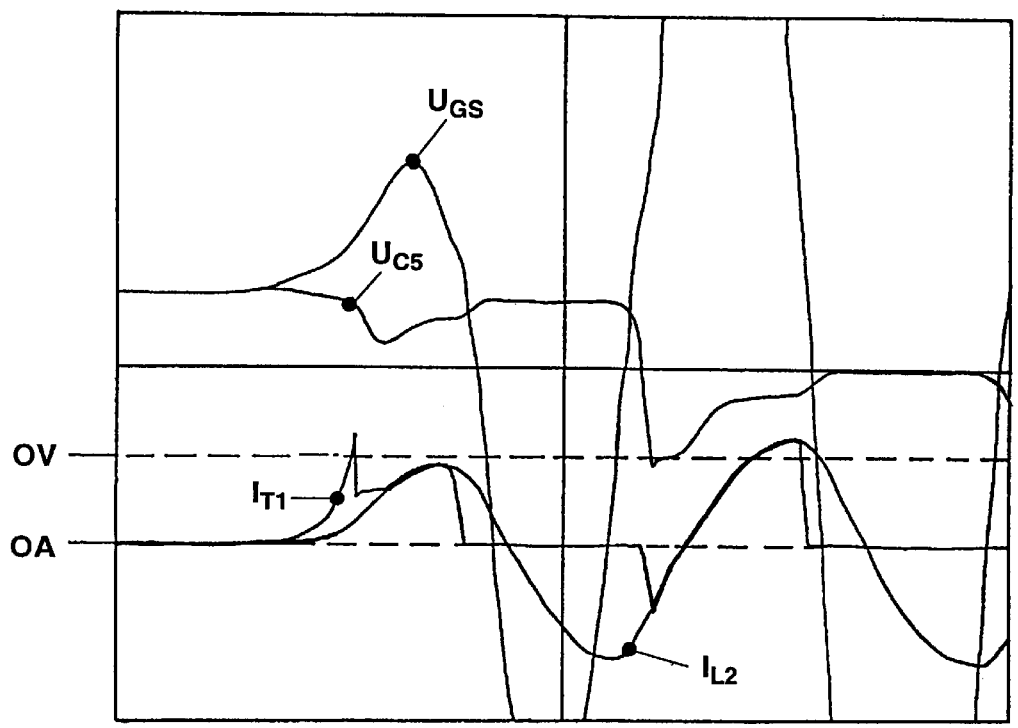
FIG. 2 shows a typical oscilloscope display illustrating the time profiles of various voltages and currents in the circuit in FIG. 1.

The starting procedure which is described above in relation to the circuit diagram in FIG. 1 is represented in a different way in FIG. 2 with reference to the gate-source voltage $U_{GS}$ of the transistor T1, the voltage $U_{C5}$ at the starting capacitor C5, the current $I_{T1}$ through the bridge transistor T1 (via the switched path) and the current $I_{L2}$ through the lamp reactor L2. The time axis runs from left to right and the deviating zero points for the voltages and the currents are shown on the left-hand edge of the figure.

It is to be noted that the charging process, that is to say the rise in the voltage $U_{C5}$ over time, is not visible on the time scale of the oscillator oscillation of the figure. The figure begins after a simultaneous rise in the voltages $U_{C5}$ and $U_{GS}$ with the upward transgression of the switching-on threshold voltage of the transistor T1, which is expressed in the sudden rise in the current $I_{T1}$. The short current peak results here from the rapid charging of the switching relief capacitor C6, but the rise in $I_{T1}$ also continues after this. The rise in the transistor current $I_{T1}$ is reflected to a certain extent in a notch in the voltage $U_{C5}$. In a profile of the voltage $U_{C5}$ over time, a relatively early decrease in the discharge process becomes apparent here, that is to say there is a slight rise in $U_{C5}$ again owing to a voltage drop which builds up at the ohmic resistor of the switched path in the transistor T1 as a result of the increasing transistor current $I_{T1}$. For this reason, the shape of this slight repeated increase corresponds in qualitative terms to the simultaneous shape of the current $I_{T1}$.

Furthermore, the diagram in FIG. 2 is, like the lamp reactor current $I_{L2}$, initiated when the transistor T1 begins to become conductive, that is to say by $I_{T1}$. The positive feedback mechanism described causes, as soon as the rise in the transistor current $I_{T1}$ occurs, the activity of the drive circuits to start, i.e. causes the subsequent de-activation of the transistor T1 by the drive circuit AS1 and subsequent activation of the transistor T2 by the drive circuit AS2. Correspondingly, the voltage $U_{GS}$ at the transistor T1 swings back to negative values, which is expressed in turn in the lamp reactor current $I_{L2}$ starting to oscillate. In the further profile over time, initial response oscillations both with the voltage $U_{GS}$ and of the load current or lamp reactor current $I_{L2}$ can be seen.

The second notch in the voltage $U_{C5}$ at the starting capacitor C5 is clearly stronger than the first, albeit qualitatively similar. The quantitative increase in the effect is due to the very much clearer conductivity of the bridge transistor T1 during the second switching-on process, which is the first to be brought about purely by the positive feedback mechanism. The potential of the bridge centre point drops, to be precise, below the reference potential of the negative supply branch, specifically because of the forward voltage of the body diode of the MOSFET T1, which diode must conduct the now considerable current flow from the lamp reactor L2.

A significant fact revealed by the diagram in FIG. 2 is that the positive feedback mechanism owing to the current $I_{L2}$ via the induction currents in the secondary windings HW1 and HW2 causes the bridge transistor T1 to switch on satisfactorily even during the first start procedure despite the discharge of the starting capacitor C5 associated with the current flow through the transistor T1.

Figure 3:
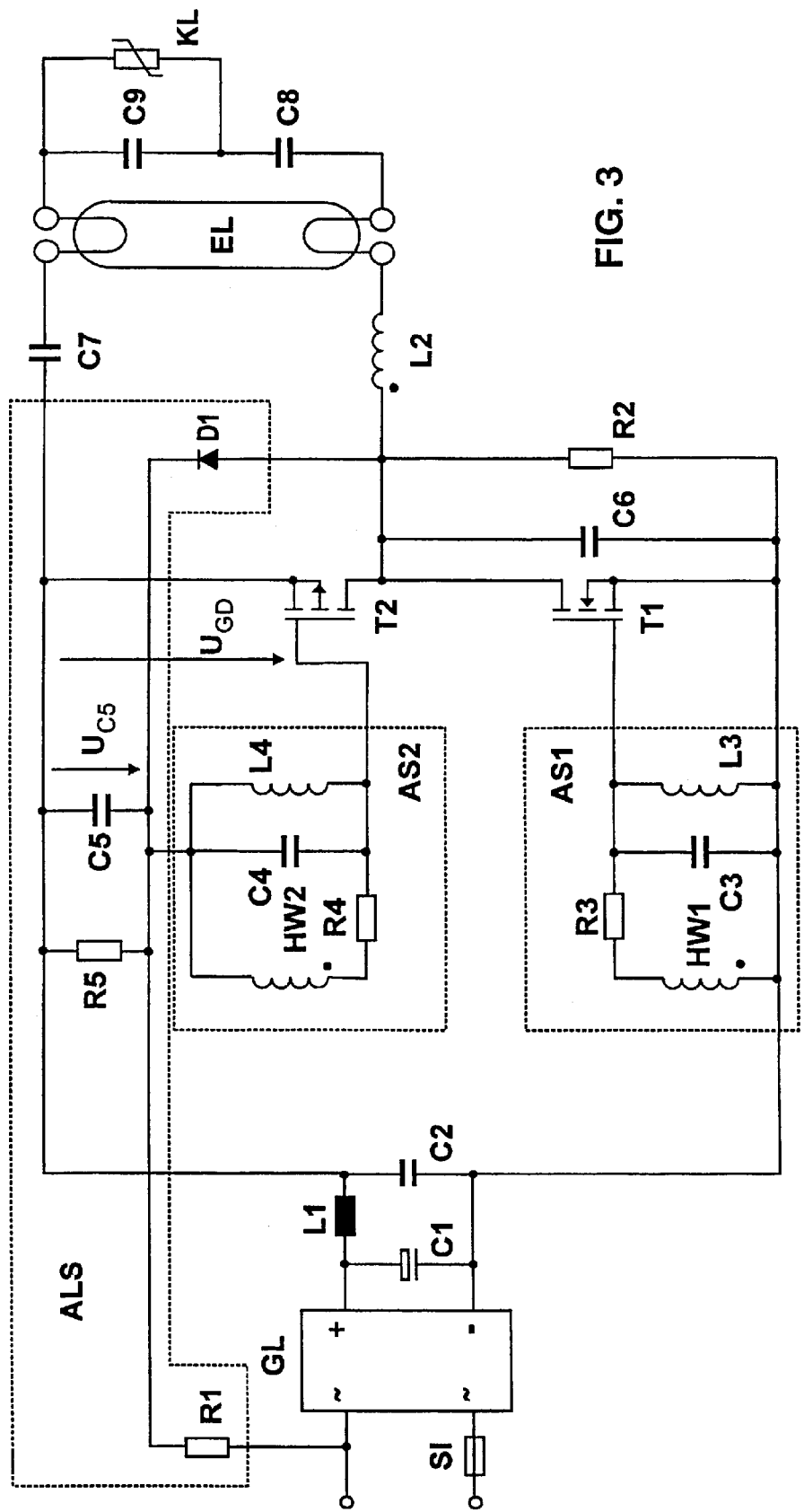
FIG. 3 shows a circuit diagram of an operating circuit corresponding largely to FIG. 1 but with an alternative connection of the starting circuit.

The second exemplary embodiment, the circuit diagram of which is shown in FIG. 3, functions in a qualitatively identical fashion. The differences with respect to the circuit in FIG. 1 are as follows: the bridge transistor T2 is now a P-type channel MOSFET instead of the previous N-type channel MOSFET. Correspondingly, the resistor R2 now lies between the bridge centre point and the negative supply branch. In addition, the drive circuit AS2 is not connected to the bridge centre point but rather to the positive, upper supply branch. As a result, the starting circuit ALS can—and this is the purpose of this exemplary embodiment—now be connected between the drive circuit AS2 and the positive supply branch. The charging resistor R1 is connected here to the other mains feed line. The polarity of the discharging diode D1 is matched, that is to say reversed. In this exemplary embodiment, the capacitor C6 also lies between the bridge centre point and the lower, that is to say negative supply branch; however, it could equally well be located at the old point. The method of operation corresponds for the rest to the previously described method and is not described here again.

Figure 4:
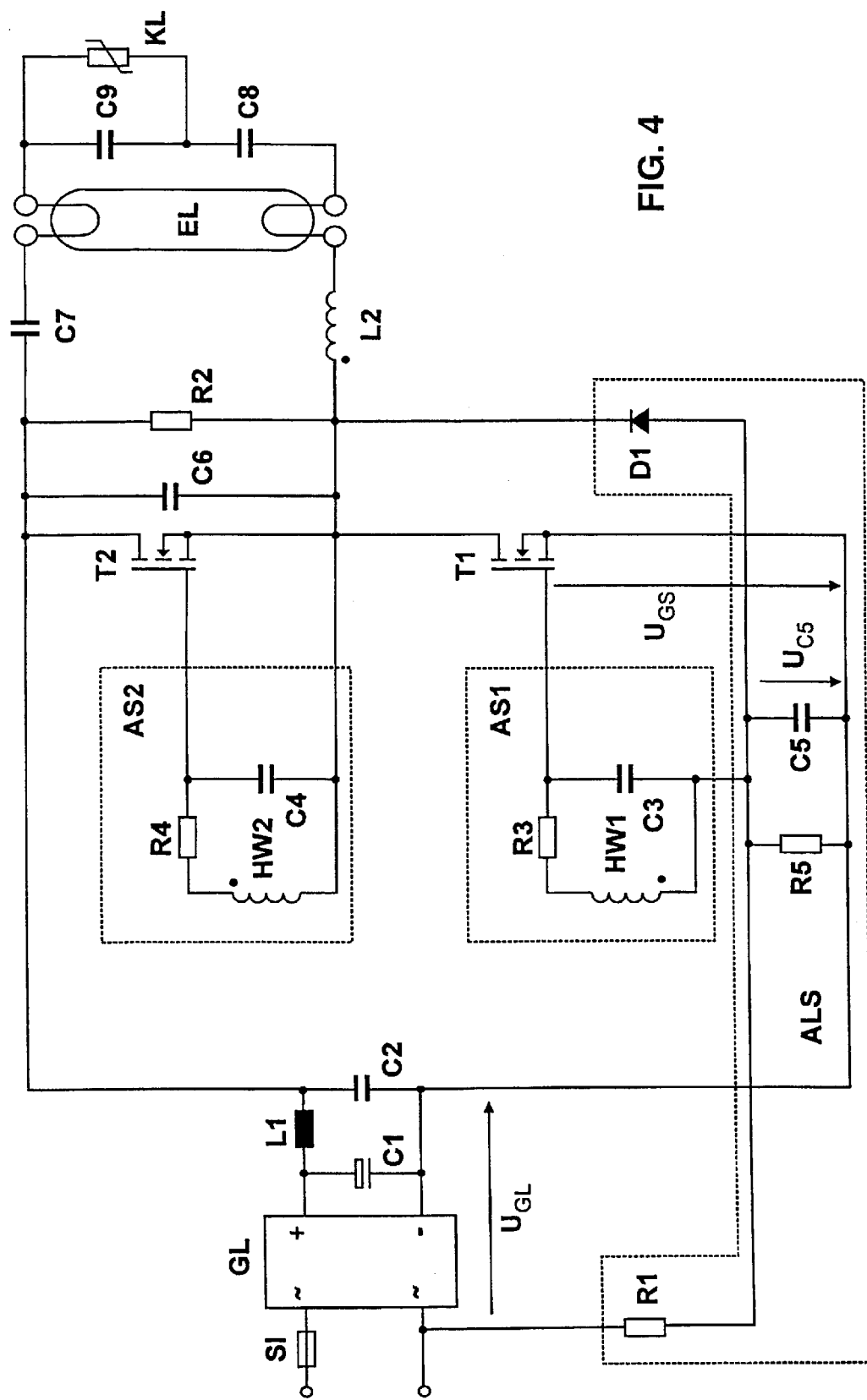
FIG. 4 shows a circuit diagram of an operating circuit corresponding largely to FIG. 1 but with an alternative embodiment of the drive circuits.

Alternatively, as shown in FIG. 4, the drive circuits AS1 and AS2 may comprise a parallel circuit of merely a capacitor C3, C4 and a series circuit formed by a resistor R3, R4 and a secondary winding HW1, HW2 of a control transformer whose primary winding is the above mentioned lamp inductor L2. The construction of the circuit is otherwise identical to the circuit shown in FIG. 1.

Typical values for significant components of the first exemplary embodiment are:

C5: 100 nF
R1: 330 kΩ
R5: 47 kΩ
D1: 1N4005.

What is claimed is:

1. An operating circuit for a load (EL) having a free-running oscillator with voltage-controlled switching elements (T1, T2) for producing a high-frequency output power for the load (EL) from a supply power, characterized by a starting circuit (ALS) for initiating the free-running oscillation with a starting capacitor (C5) connected between a drive circuit (AS1, AS2) at a control terminal of a switching element (T1, T2) and a reference potential of the switching element, a charging resistor (R1) is connected between the starting capacitor (C5) and a mains input side of a rectifier (GL), a discharging resistor (R5) connected in parallel with the starting capacitor (C5), a discharging diode (D1) connected between the drive circuit side terminal of the switching element (T1, T2) which is remote from the supply branch, for cyclically discharging the starting capacitor (C5) in oscillation mode, the drive circuit (AS1, AS2) includes a capacitor (C3) having one end thereof connected to the control terminal of the switching element (T1, T2), the other end of the capacitor (C3) is connected at a junction between the charging resistor (R1) and the starting capacitor (C5), the drive circuit (AS1, AS2) is a parallel circuit which is connected to the control terminal of the switching element (T1, T2) and comprises a capacitor (C3, C4) and a series circuit comprising a resistor (R3, R4) and a secondary winding (HW1, HW2) of a control transformer of the oscillator, in parallel with the capacitor (C3, C4) there is a coil (L3, L4) which, with the capacitor (C3, C4), forms an oscillatory circuit.

2. The operating circuit according to claim 1, in which the oscillator is a half-bridge (T1, T2).

3. The operating circuit according to claim 1, in which the voltage-controlled switching elements (T1, T2) are field-effect transistors or IGBT transistors.

4. The operating circuit according to claim 1, in which a resistor (R2) is connected between a centre tap of the oscillator and a supply branch for defining the potential states of the oscillator during starting.

* * * * *